United States Patent [19]

Goswami et al.

[11] Patent Number: 4,692,272

[45] Date of Patent: Sep. 8, 1987

[54] THERMALLY STABLE ADHESIVE COMPRISING SOLUBLE POLYIMIDE RESIN AND EPOXY RESIN

[75] Inventors: Jagadish C. Goswami, New City, N.Y.; Joseph A. Aurichio, Anderson, S.C.

[73] Assignee: Stauffer Chemical Company, Westport, Conn.

[21] Appl. No.: 774,431

[22] Filed: Sep. 12, 1985

Related U.S. Application Data

[63] Continuation-in-part of Ser. No. 660,593, Oct. 15, 1984, Pat. No. 4,604,230.

[51] Int. Cl.$^4$ ............................................. H01B 1/021
[52] U.S. Cl. .................................. 252/514; 252/512; 523/400; 523/443; 523/444; 523/458; 523/461; 525/423; 525/429

[58] Field of Search ............... 523/461, 443, 444, 458; 525/423; 252/512, 514, 186.26

[56] References Cited

U.S. PATENT DOCUMENTS 4,401,777  8/1983  Tsuboi et al. ....................... 523/451
4,557,860  12/1985  Disalvo et al. ....................... 252/512

*Primary Examiner*—Theodore E. Pertilla
*Attorney, Agent, or Firm*—Richard P. Fennelly

[57] ABSTRACT

A novel adhesive exhibiting low outgassing upon exposure to high temperatures is disclosed. The instant adhesive comprises: (a) a soluble polyimide resin, (b) a solvent for said polyimide resin, (c) an epoxy resin, (d) a cross-linking agent reactive with the polyimide solvent of (b), and (e) a catalyst which accelerates the reaction between (b) and (d). Optionally, the adhesive may also contain a conductive material. A process for making the adhesive is also disclosed.

53 Claims, No Drawings

4,692,272

THERMALLY STABLE ADHESIVE COMPRISING SOLUBLE POLYIMIDE RESIN AND EPOXY RESIN

This application is a continuation-in-part of application Ser. No. 660,593, filed Oct. 15, 1984, now U.S. Pat. No. 4,604,230, which issued on Aug. 5, 1986.

FIELD OF THE INVENTION

The present invention relates to an adhesive composition as a die attach material which exhibits very low levels of outgassing upon exposure to high temperatures.

BACKGROUND OF THE INVENTION

Adhesive compositions, particularly conductive adhesives, have recently gained great popularity in the microelectronics industry. These adhesives are used for a variety of purposes with one of the more prominent uses being the attachment of a semiconductor die, dies or chips, to a substrate, or other support medium. One common problem associated with these adhesives is that upon exposure to high temperatures they exhibit a tendency to undergo outgassing, wherein absorbed or occluded gases, formed during the curing of the adhesive, or during subsequent heat aging of the cured adhesive due to thermal instability, are released. This is a critical problem since, all too often, the success or failure of an electrical component is a direct function of the degree of outgassing undergone by the adhesive resulting in void formation within the adhesive, thereby adversely affecting the thermal and electrical properties of the adhesive.

A number of conductive and thermally stable adhesives have been reported. In U.S. Pat. No. 4,147,669, there is disclosed an electrically and thermally conductive adhesive containing an alloy formed by first mixing together gallium and tin to form an eutectic mixture, mixing a powdered metal such as gold, silver or copper with this mixture to form an alloy and then mixing a resin with a curing agent with this alloy. The resin and curing agent disclosed in this patent are any conventional type known to those skilled in the art.

In U.S. Pat. No. 4,311,615, there is disclosed an electrically conductive film comprised of a palladium (II) polyamic acid compound and an appropriate solvent such as N-methyl-2-pyrrolidone or the like. The inventors in the above patent disclose that the conductivity of the adhesive is a function of the presence of the palladium (II) ions.

U.S. Pat. No. 3,073,784 discloses an adhesive composition comprised of an organic diamine and a tetracarboxylic acid anhydride dissolved in an organic solvent. Silver is disclosed as the conductive agent.

U.S. Pat. No. 3,684,533 discloses a screen printable solder composition comprised of an active hydrogen-containing compound selected from the group of hydroxyl substituted aliphatic, mononuclear aromatic or polynuclear aromatic amines, rosin, an organic solvent and a thixotropic agent.

U.S. Pat. No. 3,746,662 discloses a thermally and/or electrically conductive polymerizable dispersion comprised of an epoxy resin, a curing agent, a powdered tough polymer component, and metal particles. The conductivity of the disclosed adhesive is increased by polar groups such as free hydroxyls or carboxyls on the epoxy resin.

U.S. Pat. No. 2,864,774 discloses a conductive composition wherein the conductive properties are attained by the in situ formation of cryptocrystalline metallic particles within a resin composition.

U.S. Pat. No. 3,677,974 discloses an electrically conductive adhesive comprised of 25-35 parts of a novolak-epoxy resin, 65-75 parts of particulate silver and 0.5-1.4 parts by weight of an imizadole curing agent.

SUMMARY OF THE INVENTION

In accordance with the present invention, there is disclosed a novel adhesive which exhibits very low levels of outgassing upon exposure to high temperatures. The adhesive of the present invention also exhibits low volume resistivity thereby showing good electrical conductivity.

The adhesive of the present invention comprises a soluble polyimide resin, a polymerizable and/or cross-linkable solvent for the polyimide resin, a polyfunctional epoxy resin, a cross-linking agent reactive with said polyimide solvent, and a catalyst capable of catalyzing said cross-linking reaction between said polyimide solvent said cross-linking agent. Optionally, a conductive material imbuing electrically conductive properties upon the adhesive composition of the present invention may be added.

Other optional components include conventional hardeners for the epoxy resin and a catalyst catalyzing the reaction of the epoxy and hardener.

DETAILED DESCRIPTION OF THE INVENTION

The soluble polyimide component of the present invention is present at from about 1.5% to about 21%, by weight of the adhesive composition, preferably from about 3% to about 9%. The type of polyimide resins described in U.S. Pat. No. 3,856,752 to J. Bateman et al. which are commercially available from Ciba-Geigy Corporation, under the trademark XU218, are suitable resins which can be utilized. These are fully imidized polyimide resins which are soluble in various solvents. They are derived from phenylindane diamines and dianhydrides as described more fully in the above-referenced U. S. patent which is incorporated herein by reference. The polyimides are prepared by reacting a phenylindane diamine with a dianhydride in an organic reaction medium which is a solvent for at least one of the reactants, preferably under anhydrous conditions under 100° C. The resulting product is a polyamide acid which is then converted to the desired polyimide by one of several methods: heating the polyamide acid solution until imidization is substantially complete; or by combining the polyamide acid solution and a dehydrating agent, with or without catalyst, and optionally heating the resulting mixture until imidization is substantially complete. Thus, it will be appreciated that a polyamide acid solution, or a partially imidized polyamide acid solution, provided it is soluble in the polyimide solvent of the present invention, can also be used in the present invention.

In order to insure dissolution of the polyimide component of the present invention into the epoxy resin component to be described below, a solvent for the polyimide component is used. Although any conventional solvent such as, for example, a neutral solvent known to those skilled in the art to which this invention pertains, can be used, it is preferable to use a solvent which is a reactive moiety capable of forming crosslinkages with another component of the present adhesive composition. Thus, the use of a reactive solvent minimizes the possibility of void formation encountered during later volatilization procedures which would be necessary if a neutral solvent were to be used. Environmental considerations may also determine the choice of solvent.

The solvent for the polyimide resin of the present invention is chosen from the group of monovinyl unsaturated compounds or other suitable unsaturated compounds having one or more unsaturated sites. A preferred solvent of the present invention is N-vinyl pyrrolidinone. The solvent is present in an amount ranging from about 15% to about 60%, by weight of the adhesive composition, preferably from about 21% to about 45%. If necessary, a small amount <5% of a neutral, or non-reactive solvent for the polyimide, such as N-methyl pyrrolidinone or N-cyclohexyl pyrrolidinone can be added to decrease the viscosity of the mixture.

The epoxy resin component which forms a portion of the present adhesive (from about 3% to about 30% by weight of the adhesive composition, preferably from about 6% to about 15%) is a conventional crosslinkable polyfunctional epoxy resin. The epoxy resins useful in this invention are those resins which contain more than one 1,2-epoxy group per molecule. They can be saturated or unsaturated aliphatic, cycloaliphatic, or heterocyclic groups and can be monomeric or polymeric in nature. The weight per epoxide of such resins can be within the range of about 100 to about 2,000.

Useful epoxy resins are the glycidyl polyethers of polyhydric phenols which are derived from an epihalohydrin, e.g., epichlorohydrin, wind a polyhydric phenol. Examples of such polyhydric phenols include resorcinol, hydroquinone, bis(4-hydroxyphenyl)-2,2-propane (or "bisphenol A" as it is commonly known), 4,4'-dihydroxybenzophenone, bis(4-hydroxyphenyl)-1,1-ethane, bis(4-hydroxyphenyl)-1,1-isobutane, bis(4-hydroxyphenyl)-2,2-butane, bis(2-dihydroxynaphthyl)methane, phloroglucinol, and bis(4-hydroxyphenyl)sulphone. Additional polyhydric phenols are novolac resins containing more than two phenol, or substituted phenol, moieties linked through methylene bridges, as well as halogenated, e.g., brominated and chlorinated, phenolic compounds.

Additional epoxy resins are glycidyl polyethers of polyhydric alcohols prepared by reacting a polyhydric alcohol with an epihalohydrin using a Lewis acid catalyst, e.g., boron trifluoride, and subsequently treating the resulting product with an alkaline dehydrogenating agent. Included among the polyhydric alcohols that can be used in the preparation of these polyepoxy materials are glycerine, ethylene glycol, propylene glycol, diethylene glycol, hexanediol, hexanetriol, trimethylolpropane, trimethylolethane, pentaerythritol and the like.

Other epoxy resins are glycidyl esters of polycarboxylic acids which are derived from an epihalohydrin and a polycarboxylic acid. Examples of polycarboxylic acids include phthalic acid or its anhydride, isophthalic acid, terephthalic acid, tetrahydrophthalic acid, hexahydrophthalic anhydride, adipic acid, dimerized fatty acids, dibasic acids made from an unsaturated fatty acid and acrylic acid, and the like.

The most preferred epoxy reins are glycidyl polyethers of polyhydric phenols, particularly the glycidyl polyether of bisphenol A and epoxylated phenol or cresol novolac resins.

Optionally a conventional hardener or curing agent for the epoxy resin can be added to the adhesive composition of the present invention. It is, of course, possible for an adhesive manufacturer to formulate the adhesive without hardener and sell it to the end user with directions to add in the hardener just prior to use. The hardener is present in an amount ranging from about 3% to about 30% by weight of the adhesive composition, preferably from about 6% to about 15%. Any conventional hardener which acts by cross-linking the epoxy resin to cure the system can be chosen.

Representative hardeners include aliphatic polyamines having at least three active amine hydrogen atoms per molecule. Examples of such amines are the polyalkylene polyamines, e.g. diethylene triamine, triethylene tetraamine, tetraethylene pentamine and pentaethylene hexamine. Additional useful amines are ethylene diamine, tetramethylene diamine, hexamethylene diamine, xylene diamine, and the like. Adducts of such amines with acrylonitrile, acrylic acid, ethyl acrylate and the like are also useful if the adduct contains at least three active amine hydrogen atoms. Also included as useful amines are amidoamines obtained by reacting polyamines with fatty acids, both monomers and dimers, provided of course that the resulting amidoamine contains at least three active amine hydrogen atoms per molecule.

Additional curing agents, or hardeners, which can be used with the compositions of this invention include the amine terminated polyamides, aromatic amines, mercaptans, anhydrides, isocyanates and catalyst/latent hardeners such as boron trifluoride, monoethylamine and dicyandiamide.

Representative aromatic amines include metaphenylene diamine, 4,4'-methylenediamine, p-aminophenyl sulfone, benzyldimethylamine and the like. Exemplary anhydride hardeners are NADIC METHYL ANHYDRIDE BRAND hardener (methyl-bicyclo[2.2.1]heptene-2,3-dicarboxylic anhydride isomers) available from Polysciences Corporation, hexahydrophthalic anhydride, phthalic anhydride, pyromellitic dianhydride, maleic anhydride, trimellitic anhydride, benzophenone tetracarboxylic dianhydride, chlorendic anhydride and dodecenylsuccinic anhydride.

In those instances where the adhesive composition of the present invention is to be used in high temperature applications, it is preferred that the hardener for the epoxy be non-heat reactive. Particularly preferred non-heat reactive hardeners are those of the "BR" series manufactured by Union Carbide Corporation. These are phenolic novolak hardeners for solid epoxy compounds. One especially preferred resin of this series is sold under the designation BRWE-5555. This is a solid phenolic novolak hardener having a melt viscosity at 150° C. of 800 to 2500 centipoises, a softening point of 190° to 210° F. and a phenolic hydroxyl equivalent weight of 107 (g/g-mol).

Also useful as a hardener for the epoxy resin used in the present invention is bis(4-hydroxyphenyl)-2,2-propane or "bisphenol A" as it is commonly known.

If so desired, in order to accelerate the reaction between the epoxy resin and the curing agent, there is used a catalyst ranging from about 0.3% to about 3% by weight of the adhesive composition, preferably from about 1.5% to about 3%. The preferred catalyst is an alkyl or aryl substituted imidazole catalyst. Preferred catalysts which may be used in the present invention include 2-ethyl, 4-methyl imidazole (EMI, Aldrich Chemical), 2-methylimidazole, and the like.

The cross-linking agent of the present invention is present in amounts ranging from about 15% to about 60% by weight of the adhesive composition, preferably 21% to about 45%. The cross-linking agent is reactive with the solvent for the polyimide resin and is chosen from the group consisting of polyethylenically unsaturated organic compounds copolymerizable with monovinyl or other ethylenically unsaturated organic compounds.

Representative cross-linking agents include, but are not limited to, triallyl-S-triazine-2,4,6 trione, triallyl cyanurate, triallyl phosphate, triallyl phosphite, triallyl trimellitate, triallyl trimesate, tetrallyl pyromellitate, diallyl diglycolate, diallyl diglycol carbonate, diallyl fumarate, diallyl isocyanate, diallyl itaconate, diallyl maleate, diallyl malonate, diallyl phthalate, and divinyl compounds, e.g. divinyl sulfone, divinyl sebacate, divinyl ethers and divinyl benzene.

Other compounds useful as cross-linking agents in the composition of the present invention include: glycol diacrylates and triacrylates, glycol di- and trimethacrylates, ethylene glycol dimethacrylate, propylene glycol dimethacrylate, 1,3-butylene glycol dimethacrylate, and trimethylolpropane trimethacrylate.

Additional compounds useful as cross-linking agents in the present invention include: diallyl succinate, diallyl adipate, diallyl sebacate, diallyl ethylene carbonate, triallyl aconitate, triallyl borate, triallyl citrate, triallyl pyromellitate, triallyl aluminate, triallyl titanate, tetraallyl benzene tetracarboxylate, tetrallyl thiophosphonate, and triallyl phenyl phosphate.

To facilitate the cross-linking reaction between the polyimide solvent and the cross-linking agent, the present invention uses a catalyst in amounts ranging from about 1.5% to about 15% by weight of the adhesive mixture, preferably from about 3% to about 9%. Contemplated catalysts usable in the present invention include any free radical generating polymerization catalyst having a half life preferably, but not necessarily, of the same order as the cure time at the temperature chosen, said temperature to be described in the process section hereinafter.

Preferred catalysts are organic peroxides (Lucidol Division, Pennwalt Company), including, for example, di-t-butyl peroxide, t-butyl peroxypivalate, 2,4-dichlorobenzoyl peroxide, caprylyl peroxide, lauroyl peroxide, propionyl peroxide, acetyl peroxide, t-butyl peroxyisobutyrate, p-chlorobenzoyl peroxide, benzoyl peroxide, hydroxyheptyl peroxide, cyclohexanone peroxide, 2,5-dimethylhexyl-2,5-di(peroxybenzoate), di-t-butyl diperphthalate, t-butylperacetate, t-butylperbenzoate, dicumyl peroxide, 2,5-dimethyl-2,5-di(t-butylperoxy)hexane, t-butyl hydroperoxide, methyl ethyl ketone peroxides, p-methane hypoperoxide, cumene hydroperoxide, 2,5-dimethylhexyl-2,5-dihydroperoxide, and t-butyl hydroperoxide.

Also useful as catalysts in the present invention are gem-diperoxides (as defined in O. Hagell and S. Sheppard Encyclopedia of Chemical Technology, Vol. 14 (1967) p.786) or peroxyketals having the formula:

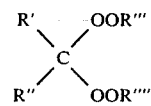

where R', R", R''' and R'''' are the same or different and are hydrogen, alkyl of from 1 to 20 carbon atoms, alkenyl, aryl, aralkyl, alkaryl, haloalkyl, haloalkenyl, haloaryl or a heterocyclic moiety.

Representative peroxyketals useful in the present invention include, 1,1-bis(butylperoxy)3,3,5-trimethylcyclohexane, 1,1-di-(t-butylperoxy)cyclohexane, 2,2-bis(t-butylperoxy) butane, ethyl 3,3-di(butylperoxy)butyrate, n-butyl-4,4-bis(t-butylperoxy)valerate.

Other peroxide derivatives useful as catalysts in the present invention are t-amyl peroxides (Lucidol Division, Pennwalt Company). Representative t-amyl peroxides include: t-amylperoxyneodecanoate, t-amylperoxyneoheptanoate, t-amylperoxy pivalate, t-amylperoxy-2-ethyl hexanoate, t-amyl peroxybenzoate, t-amyl peroxyacetate, 1,1-di-(t-amylperoxy)cyclohexane, 2,2-di-(t-amylperoxy)propane ethyl 3,3-di-(t-amylperoxy) butyrate, and 00-t-amyl 0-(2-ethylhexyl)-monoperoxycarbonate.

Also useful as a catalyst in the present invention is the compound 1,1-azobis(cyclohexanecarbonitrile) sold under the trademark VAZO ® 88 by DuPont Company.

Optionally, in order to improve the screen printability (wettability of the adhesive composition to the polyolefin carrier film used as a substrate for the transfer of the adhesive, to be described more fully below), the adhesive composition of the present invention has incorporated therein a filler such as glass, silica (e.g. Cab-O-Sil silica filler) in an amount ranging from about 0.3% to about 30% by weight of the adhesive composition, preferably from about 0.3% to about 21%. The filler also assists in the reduction of voids or pinholes generated in the cured adhesive. The preferred filler is glass of a size less than 10 microns available from Transene Corporation, under the designation TGC-230, TGC-10, etc. If a glass filler is used, preferably the melting point of the glass should be between 350° C. and 500 ° C. If silica is used as a filler, the size should be less than 1 micron. Said grde of silica is available from Degussa and sold under the designation TS-100.

The metals, optionally present in the compositions of the present invention, are used to impart electrical conductivity to the adhesive of the present invention. The metal particles can be employed in an amount ranging from about 50% to about 75% by weight of the adhesive composition, preferably from about 55% to about 70%. To achieve volume resistivity in the final cured product of 0.1 ohm/cm or less, it is preferred that the particles be noble metals such as silver or gold or noble metals coated on non-noble metals such as copper, iron, nickel, or aluminum. For easy dispersion, the metal particles should preferably be of a size less than 10 microns. The preferred metal is silver and a preferred grade of silver is that sold under the designations SR-235, SF-282, etc. (Silver powder) by Handy and Harman.

Surprisingly, it has also been found that the adhesive composition of the present invention can actually be divided into component parts. For those applications requiring a conventional adhesive, the soluble polyimide resin dissolved in the solvent for the polyimide can be mixed with an epoxy resin to form an epoxy modified polyimide adhesive composition.

In the adhesive composition of the present invention, the amount of the soluble polyimide resin can range from about 10 to about 20 percent, by weight. The solvent for the polyimide is present in an amount ranging from about 50 to about 60 percent, by weight. The epoxy resin is present in an amount ranging from about 20 to about 30 percent, by weight. For more sophisticated applications, i.e., high temperature applications, conductive adhesives, etc., a stability enhancing component comprising a component cross-reactive with the polyimide solvent and a catalyst accelerating the above cross-reaction can be added.

In the stability enhancing component for an adhesive composition of the present invention, the component cross reactive with a soluble polyimide resin is present in an amount ranging from about 70 to about 90 percent, by weight. The catalyst accelerating the above cross reaction is present in an amount ranging from about 10 to about 30 percent, by weight.

Each of the above components also has its own utility and form a part of the present invention.

A representative non-limiting, procedure for the preparation of the adhesive composition employed herein is as follows:

The soluble polyimide resin, in an amount ranging from about 0.25 gram to about 0.35 gram (about 1% to about 2% by weight of the final adhesive composition) is dissolved in a polyimide solvent. The amount of polyimide solvent used ranges from about 1.0 to about 2.0 grams with the amount ultimately determined by how well the polyimide dissolves in the solvent. The polyimide-polyimide solvent mixture is heated to about 80° C.

After the above mixture has become a homogeneous solution, i.e. a clear solution, a suitable amount of epoxy resin plus hardener, said amount of resin plus hardener usually comprising an approximately 1:1 ratio of resin to hardener, and said amount of resin plus hardener further comprising an amount of from about 0.2 to about 1.0 grams of resin (about 3% to about 10% by weight of the final adhesive composition) and from about 0.1 to about 1.0 gram of hardener (from about 3% to about 10% by weight of the final adhesive composition) is added.

The above solution is allowed to cool down and optionally a suitable amount, ranging from about 0.1 to about 0.5 gram (about 0.1% to about 1% by weight of the final adhesive composition) of a catalyst which accelerates the curing of the epoxy resin is added. Preferably, this catalyst is dissolved in the polyimide solvent.

To the above solution is then added a suitable amount, ranging from about 1.0 to about 3.0 grams (about 7.5% to about 20% by weight of the final adhesive composition) of a previously mixed solution of the cross-linking agent plus a catalyst which catalyzes the cross-linking of the unsaturated components of the adhesive composition, said previously mixed solution comprised of from about 1.0 to about 3.0 grams of the cross-linking agent (about 7.5% to about 20% by weight of the final adhesive composition) and from about 0.1 to about 1.0 grams of the catalyst (about 0.5% to about 5% by weight of the final adhesive composition).

If desired, to the solution above is added a suitable amount of an optional filler, said suitable amount ranging from about 0.05 gram to about 0.5 gram (about 0.03% to about 3.0% by weight of the final adhesive composition).

If conductive properties are desired, there is added to the above composition a suitable amount of a conductive material, ranging from about 5.0 grams to about 10.0 grams (about 55% to about 70% by weight of the reaction mixture).

The type of adhesive composition which is formed by using these components has utility in various bonding applications where high temperature characteristics are important. For example, metal-to-metal bonding and plastic bonding in high temperature environments are examples of where the adhesive can find utility.

Since the adhesive of the present composition can also have good conductive properties, as determined by standard volume resistivity measurements well known to those skilled in the art to which this invention pertains, one particularly suitable use is semiconductor die bonding to chip substrates.

The present invention is further illustrated by the Examples which follow which give certain preferred embodiments for the adhesive of the present invention.

EXAMPLE 1

Polyimide resin (CIBA-GEIGY XU-218 brand), 0.25 gram was dissolved in 1.3 grams of N-vinyl pyrrolidinone. The mixture was heated to about 80° C. To this was added a previously mixed solution of 0.7 gram total of an epoxy cresol novalac resin (CIBA-GEIGY ECN-1235) plus a NADIC METHYL ANHYDRIDE hardener (0.4 gram resin, 0.3 gram hardener). The mixture was cooled down and 0.1 gram of 2-ethyl-4-methyl imidazole dissolved in 20 parts N-vinyl pyrrolidinone added as a catalyst. To this mixture was then added a premixed 1.4 gram (1.3 gram cross-linking agent, 0.1 gram catalyst) solution of triallyl-S-triazine-2,4,6 trione and di-tertiary butyl peroxide. 0.2 gram of glass filler and 8.8 grams of silver powder were then added to the composition. The composition was first cured at 120° C. for 45 minutes followed by 240° C. for 15 minutes. The adhesive composition gave strong die to substrate bonding. Thermogravimetric analysis of the cured composition showed a weight loss of only 0.25% at 400° C. for 10 minutes. The volume resistivity of the cured adhesive was $2.8 \times 10^{-4}$ ohm/cm.

EXAMPLES 2-3

The following Table shows alternative formulations which can be used:

TABLE I

| INGREDIENTS (grams) | EXAMPLE NO. 2 | EXAMPLE NO. 3 |
|---|---|---|
| Polyimide resin (Ciba-Geigy XU-218) | 0.3 | 0.25 |
| N—vinyl pyrrolidinone (NVP) | 1.3 | 1.3 |
| Polyvinyl pyrrolidinone | 0.05 | 0.05 |
| Epoxy cresol novolac resin (CIBA-GEIGY ECN-1235) | 0.4 | 0.4 |
| NADIC METHYL ANHYDRIDE hardener | 0.3 | 0.3 |
| 2-ethyl 4-methylimidazole (solution in NVP) | 0.1 | 0.1 |
| Triallyl-S—triazine-2,4,6 trione | 1.3 | 1.3 |
| Di-tertiary butyl peroxide | 0.4 | 0.4 |
| Glass filler | 0.2 | — |
| Silica filler | — | 0.05 |
| Silver powder | 9.6 | 9.2 |
| Weight Loss (%) 400° C./10 min. | 0.37% | 0.30% |

TABLE I-continued

| INGREDIENTS (grams) | EXAMPLE NO. | |
|---|---|---|
| | 2 | 3 |
| (3 mil film) | | |

1 mil = $10^{-3}$ inch

Ion chromatography showed the following water extractable impurities in the cured adhesive of Example 2: sodium <29 ppm, potassium 3 ppm, and chloride 22 ppm.

EXAMPLE 4

This example shows the screen printability of Examples 1, 2, 3, the transfer of the screen printed B-staged adhesive to the wafer, followed by dicing the adhesive attached to the wafer to individual chips containing the adhesive which are then tested for shear strength, void generation, etc. The entire process is detailed below.

A 4 1/16 inch circle of the adhesive was printed onto an Akrosil ® 4.0 mils (1 mil=$10^{-3}$ inch) 2G/0 low density polyethylene film (release liner). The printed adhesive was B-staged (dried) to a tacky state using a forced-air oven set at 50° C. Time was varied from 10 to 16 minutes. Fifteen minutes was chosen for best tack and film strength.

The B-staged adhesive was approximately 0.9 mils thick (0.5 to 1.5 mils thickness was targeted). A cover sheet was placed onto the adhesive via laminative techniques to protect the tacky adhesive from dirt or physical abuse. The cover sheet was a semi-bleached kraft paper with suitable release coating.

The cover sheet was then peeled away from the adhesive and a silicon wafer was mounted to the adhesive, using a Kulicke & Soffa Model 366 Wafer Mounter.

The mounted sample was then diced on a Disco Model DAD-2H Automatic Wafer Scriber-Diser. The diser cut through the wafer, through the adhesive and partially into the 4.0 mils carrier film.

No dies were lost during the dicing operation. The dies were then picked with a tweezer from the carrier film, lifting the adhesive (attached to the dies) from the carrier.

The dies were then attached to a preheated glass substrate. It has been found that preheating the substrate facilitates time for attachment and provides improved wetting to the substrate.

The attachment of the dies to the glass substrate was then accomplished by curing the adhesive using a temperature schedule of:
125° C. for 10 minutes, followed by
175° C. for 10 minutes, followed by
200° C. for 30 minutes
or an alternate schedule could be:
120° C. for 45 minutes, followed by
240° C. for 30 minutes.

Alternatively, a decal method well known to those skilled in the art to which this invention pertains could be used in lieu of the wafer mounter technique previously described.

Die shear, or the measure of bond strength between the die and substrate, was evaluated using a Chatillon force gauge with a push-probe set to complete a force in a horizontal motion. The force required to dislodge each die was recorded. The results are summarized in Table II.

TABLE II

| | EXAMPLE NO. | | |
|---|---|---|---|
| | 1 | 2 | 3 |
| METHOD I (cured @ 120° C./45 min. followed by 200° C./30 min.) | | | |
| Die shear (lbs) 200 mil$^2$ die | 30 | >30 | 30 |
| % void generation | 5 | 20 | 5 |
| Die shear (lbs) after 430° C./8 min. (lid seal temperature) | 8 | >30 | 5 |
| METHOD II (cured @ 120° C./45 min. followed by 240° C./30 min.) | | | |
| Die shear (lbs) 200 mil$^2$ dice | 30 | >30 | 30 |
| % void generation | 5 | 20 | 5 |
| Die shear (lbs) after 430° C./8 min. (lid seal temperature) | 18 | 30 | 12 |

Thus, the lower temperature phase (120° C.) results in an improved attachment of the die/adhesive/substrate; whereas the higher phases complete the cure. Schedules as detailed above provide improved void-free cures as compared to samples cured at high temperatures initially. Method II also shows that the higher temperature cure (120° C./45 min. plus 240° C./30 min.) also provides acceptable die shear values.

EXAMPLES 5-7

The following Examples illustrate alternative formulations using different epoxy resins, different hardeners for the epoxy resins and different accelerating catalysts.

| | EXAMPLE NO. | | |
|---|---|---|---|
| Ingredients (grams) | 5 | 6 | 7 |
| Polyimide resin (CIBA-GEIGY XU-218) | 0.25 | 0.25 | 0.25 |
| Phenylglycidyl ether | 0.40 | 0.40 | 0.40 |
| N—vinyl pyrrolidinone (NVP) | 0.80 | 0.80 | 0.80 |
| Quatrex-2010 (Dow) | 0.50 | 0.50 | 0.50 |
| BRWE-5555 (Union Carbide)* | 1.00 | 1.00 | — |
| Bisphenol "A"* | — | — | 1.00 |
| 2-ethyl 4 methyl imidazole | 0.10 | 0.10 | 0.10 |
| Triallyl-S—triazine 2,4,6-trione | 1.00 | 1.00 | 1.00 |
| Di-tertiary butyl peroxide | 0.50 | — | 0.30 |
| Vazo ® 88 | — | 0.05 | — |
| Silica filler | 0.05 | 0.05 | 0.05 |
| Silver powder | 9.68 | 9.46 | 9.70 |

*25% solution in N—methyl pyrrolidinone

EXAMPLE 8

Table III summarizes the physical characteristics of the adhesive of Examples 5-7.

TABLE III

| Ex. No. | B-Stage | Void* | 25° C. Die Shear | Hot Die Shear (Glass) |
|---|---|---|---|---|
| 5 | 50°/15 | Low | >30 | 11.5 |
| 6 | 50°/15 | Low | >30 | >25 |
| 7 | 50° C./10 | V. Low | >30 | 2.5 |

*after curing at 120° C./45' and then at 280° C./30'

Additional features of the preferred and most preferred embodiments of the present invention are found in the claims hereinafter.

What is claimed is:

1. An adhesive composition comprising: (a) a soluble polyimide resin; (b) a solvent for said polyimide resin; (c) an epoxy resin; (d) a cross-linking agent reactive with the polyimide solvent of (b); and (e) a catalyst which catalyzes the cross-linking reaction of (b) and (d).

2. A composition according to claim 1 wherein the soluble polyimide resin is a polyimide resin derived from phenylindane diamines and dianhydrides, polyamide acid or a partially imidized polyamide acid.

3. A composition according to claim 1 wherein said soluble polyimide resin comprises from about 1.5% to about 21% by weight of the reaction mixture.

4. A composition according to claim 1 wherein the solvent for the polyimide resin is an ethylenically unsaturated organic compound having one or more unsaturated sites.

5. A composition according to claim 4 wherein said polyimide solvent is N-vinyl pyrrolidinone.

6. A composition according to claim 1 wherein said solvent for the polyimide resin comprises from about 15% to about 60% by weight of the adhesive composition.

7. A composition according to claim 1 wherein said epoxy resin is a glycidyl polyether of a polyhydric phenol.

8. A composition according to claim 1 wherein said epoxy resin is a glycidyl ether of a polyhydric alcohol.

9. A composition according to claim 1 wherein said epoxy resin is a glycidyl ester of a polycarboxylic acid.

10. A composition according to claim 1 wherein said epoxy resin is a glycidyl polyether of a polyhydric alcohol.

11. A composition according to claim 1 wherein said epoxy resin comprises from about 3% to about 30% by weight of the adhesive composition.

12. A composition according to claim 1 furthe comprising a hardener for said epoxy resin selected from the group of aliphatic amines having at least three active amine hydrogen atoms per molecule.

13. A composition according to claim 12 wherein said hardener for said epoxy resin is an amidoamine obtained by reacting a polyamine with a fatty acid.

14. A composition according to claim 12 wherein said hardener for said epoxy resin is selected from the group consisting of mercaptans and isocyanates.

15. A composition according to claim 12 wherein said hardener for said epoxy resin is an anhydride curing agent.

16. A composition according to claim 15 wherein said hardeners for said epoxy resin are methyl-bicyclo (2.2.1)heptane-2,3 dicarboxylic anhydride isomers.

17. A composition according to claim 12 wherein said hardener for said epoxy resin is an aromatic amine.

18. A composition according to claim 1 comprising a hardener for said epoxy selected from the group consisting of non-heat reactive phenolic novolak hardeners.

19. A composition according to claim 1 comprising bis(4-hydroxyphenyl)-2,2-propane as a hardener for the epoxy resin.

20. A composition according to claim 12 wherein said hardener for said epoxy resin comprises from about 3% to about 15% by weight of the adhesive composition.

21. A composition according to claim 1 further comprising a catalyst accelerating the curing of said epoxy resin selected from the group consisting of alkyl or aryl substituted imidazole catalysts.

22. A composition according to claim 21 wherein said catalyst is 2-ethyl, 4-methyl imidazole.

23. A composition according to claim 21 wherein said catalyst comprises from about 0.3% to about 3% by weight of the adhesive composition.

24. A composition according to claim 1 wherein said cross-linking agent reactive with the solvent for the polyimide is a polyethylenically unsaturated organic compound.

25. A composition according to claim 24 wherein said cross-linking agent is triallyl-S-triazine-2,4,6 trione.

26. A composition according to claim 1 wherein said cross-linking agent comprises from about 15% to about 60% by weight of the adhesive composition.

27. A composition according to claim 1 wherein said catalyst catalyzing the cross-linking reaction of (b) and (d) is an organic catalyst having a half life, preferably, but not necessarily, of the same order as the cure time at the temperature chosen.

28. A composition according to claim 27 wherein said organic catalyst is an organic peroxide.

29. A composition according to claim 28 wherein said organic peroxide is di-tertiary butyl peroxide.

30. A composition according to claim 27 wherein said organic catalyst is a peroxyketal.

31. A composition according to claim 28 wherein said organic catalyst is a t-amyl peroxide.

32. A composition according to claim 1 wherein said catalyst catalyzing the cross-linking reaction between (b) and (d) is 1,1'-azobis(cyclohexanecarbonitrile).

33. A composition according to claim 1 wherein said catalyst catalyzing the cross-linking reaction between (b) and (d) comprises from about 1.5% to about 15% by weight of the adhesive composition.

34. A composition according to claim 1 further comprising filler material selected from the group consisting of glass or silica fillers.

35. A composition according to claim 34 wherein said filler is glass.

36. A composition according to claim 35 wherein said filler material comprises glass fillers of a size less than 10 microns and preferably of a melting point from about 350° C. to about 500° C.

37. A composition according to claim 34 wherein said filler is silica.

38. A composition according to claim 37 wherein said filler is silica of a size less than 1 micron.

39. A composition according to claim 34 wherein said filler material comprises from about 0.3% to about 15% by weight of the adhesive composition.

40. A composition according to claim 1, further comprising a conductive material.

41. A composition according to claim 40 wherein the conductive material is a noble metal.

42. A composition according to claim 41 wherein the noble metal is silver.

43. A composition according to claim 40 wherein the conductive material is a noble metal coated on a non-noble metal.

44. A composition according to claim 40 wherein the conductive material comprises from about 55% to about 70% by weight of the reaction mixture.

45. A composition according to claim 1 cured at about 90° C. to about 120° C. for a suitable period of time.

46. A composition according to claim 45 cured at about 90° C. to about 120° C. for about 45 minutes.

47. A composition according to claim 45 further cured at about 200° C. to about 280° C. for a suitable period of time.

48. A composition according to claim 47 further cured at about 200° C. to about 280° C. for about 30 minutes.

49. A composition according to claim 40 cured at about 90° C. to about 120° C. for a suitable period of time.

50. A composition according to claim 49 cured at about 90° C. to about 120° C. for about 45 minutes.

51. A composition according to claim 49 further cured at about 200° C. to about 280° C. for a suitable period of time.

52. A composition according to claim 51 further cured at about 200° C. to about 280° C. for about 30 minutes.

53. A composition according to claim 1 cured at about 50° C. for about 10 to about 15 minutes.

* * * * *